Feb. 17, 1942. N. M. COUTY ET AL 2,273,398
FLEXIBLE HOSE COUPLING
Filed May 2, 1941 2 Sheets-Sheet 2
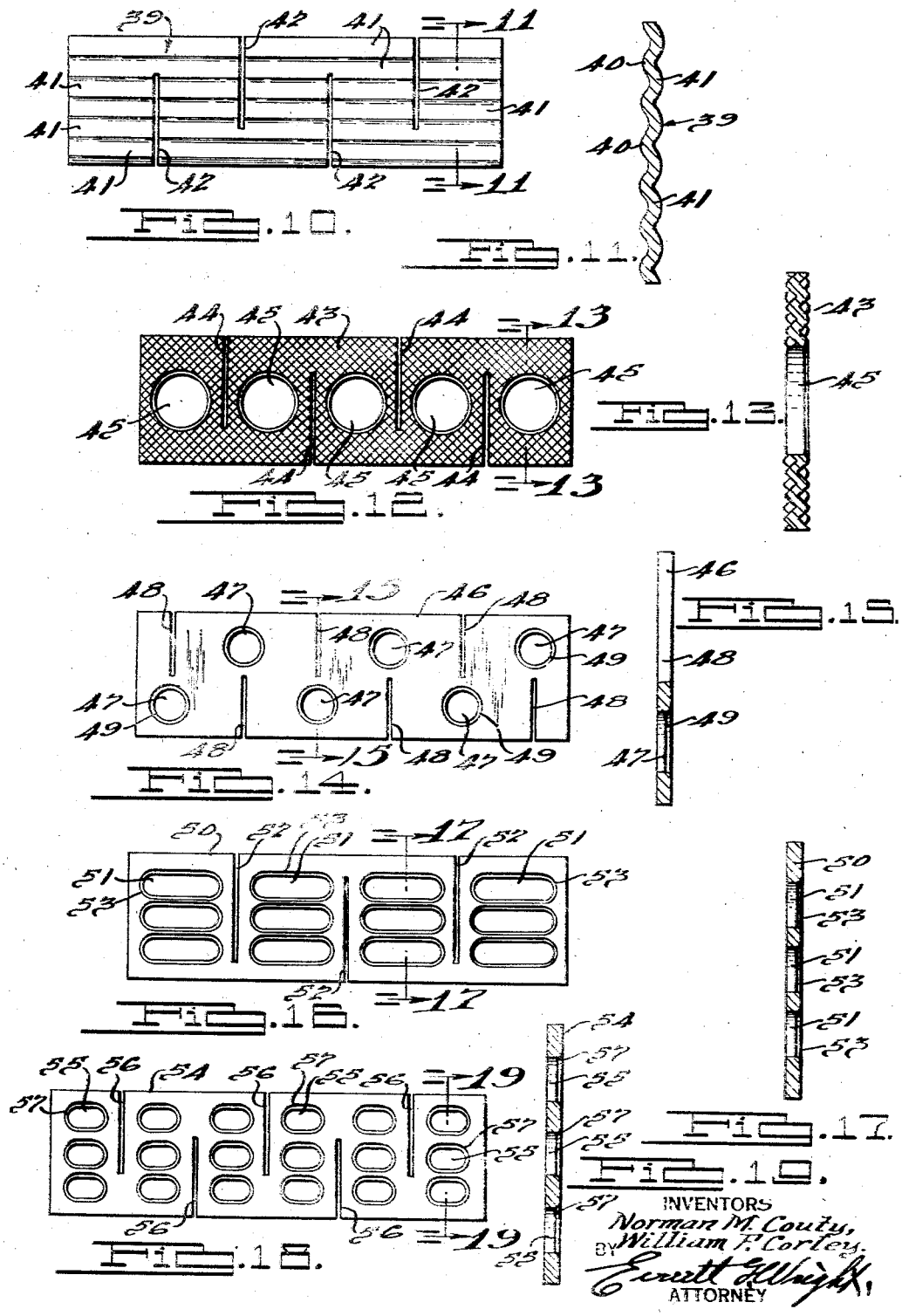
INVENTORS
Norman M. Couty,
William P. Corley
ATTORNEY Patented Feb. 17, 1942

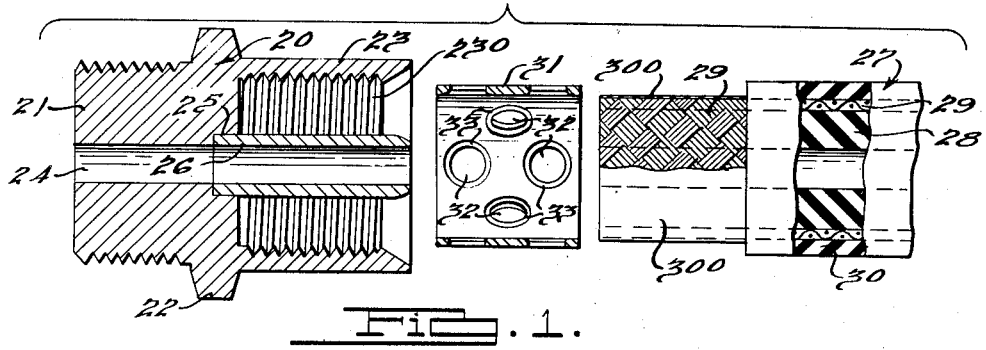

2,273,398

UNITED STATES PATENT OFFICE 2,273,398

FLEXIBLE HOSE COUPLING

Norman M. Couty and William F. Corley, Detroit, Mich., assignors to The Flex-O-Tube Company, a corporation of Delaware Application May 2, 1941, Serial No. 391,520

1 Claim. (Cl. 285—84)

This invention relates to flexible hose couplings and in particular to means for securing reinforced flexible hose to the coupling member.

In the prior art, when securing reinforced flexible hose of the type wherein a woven or braided reinforcement is covered with a sheath of rubber, neoprene, or the like to a hose coupling, the rubber or neoprene sheath over the reinforcement is stripped off or otherwise removed, a lead or similar soft ductile metal ring is telescoped over the stripped end of the said hose, and the stripped end of the hose and ductile ring are placed into an internally deformed cupped end of a coupling member over a centrally disposed stem within the said cupped end of the said coupling member. The said cupped end of the coupling member is then crimped, swedged or otherwise pressed into engagement with the soft ductile metal ring which is thereby deformed into intimate engagement with and into the interstices of the exposed wire reinforcement of the flexible hose whereby to anchor the said flexible hose within the cupped end of the coupling member.

The prior art construction, while deemed satisfactory for some uses, will not withstand satisfactorily extreme and repeated combined tensioning and flexing of the hose with respect to the coupling member inasmuch as it is extremely difficult and expensive to strip off or remove the rubber or neoprene sheath over the reinforcement of the flexible hose sufficiently to properly expose the wire mesh or braid reinforcement so as to permit it to become embedded into the soft ductile metal ring when the cupped end of the fitting is crimped, swedged or otherwise pressed in final assembly. Also, the soft metal ring wears easily during repeated extreme flexing of the hose with respect to the fitting, particularly when the hose is also tensioned with respect to the fitting, and, as a consequence, the hose connection to the fitting soon becomes sufficiently loose that leaks and blowouts occur when the hose and fitting are subjected to repeated flexing and to pressures upwards of 1000 lbs. per square inch. Furthermore, when a lead or like soft metal ductile ring is employed between the exposed hose reinforcement and the internally deformed cup of the coupling member, the said ductile ring softens or begins to soften under temperatures safely withstood by the hose, and, as a result, the soft metal ductile ring wears more easily during repeated flexing of the hose with respect to the fitting and leaks and blowouts more readily occur.

With the foregoing in view, the primary object of the invention is to provide a coupling member for reinforced flexible hose which will withstand repeated flexings while under pressure without damage to the hose or reinforcement thereof and which will not become loosened by repeated flexing of the hose while the hose is tensioned with respect to the fitting.

Another object of the invention is to provide a coupling member for reinforced flexible hose which is equally effective under all temperatures within the range of temperature that may be safely withstood by the hose.

Another object of the invention is to provide a coupling member for reinforced flexible hose wherein the reinforcement of the hose need not be exposed at the end thereof engaged by and within the coupling member to accomplish a positive pressure and leakproof connection between the flexible hose and the coupling member.

Other objects of the invention will become apparent by reference to the following detailed description taken in connection with the accompanying drawings, in which:

Fig. 1 is an exposed longitudinal sectional view of a hose coupling for reinforced flexible hose embodying the invention.

Fig. 2 is a longitudinal sectional view of the flexible hose coupling disclosed in Fig. 1 assembled prior to crimping, swedging, or otherwise deforming the coupling in permanently fixed engagement with the reinforced flexible hose.

Fig. 3 is a longitudinal sectional view of a completed flexible hose coupling embodying the invention.

Fig. 4 is an enlarged fragmentary view showing the engagement of the reinforced flexible hose by the coupling member and the deformation of the hose and reinforcement in the apertures of the retainer ring employed.

Fig. 5 is a side elevational view of the retainer ring of the embodiment of the invention disclosed in Figs. 1 to 4 inclusive.

Fig. 6 is a developed view of the retainer ring disclosed in Figs. 1 to 5 inclusive.

Fig. 7 is a sectional view taken on the line 7—7 of Fig. 6.

Fig. 8 is a developed view of another retainer ring which may be substituted for the retainer ring shown in Figs. 1 to 7 inclusive.

Fig. 9 is a sectional view taken on the line 9—9 of Fig. 8.

Fig. 10 is a developed view of a crimped type retainer ring which may be substituted for the retainer ring shown in Figs. 1 to 7 inclusive.

Fig. 11 is a sectional view taken on the line 11—11 of Fig. 10.

Fig. 12 is a developed view of a knurled type retainer ring which may be substituted for the retainer ring shown in Figs. 1 to 7 inclusive.

Fig. 13 is a sectional view taken on the line 13—13 of Fig. 12.

Fig. 14 is a developed view of another type of retainer ring which may be substituted for the retainer ring shown in Figs. 1 to 7 inclusive.

Fig. 15 is a sectional view taken on the line 15—15 of Fig. 14.

Fig. 16 is a developed view of another type of retainer ring which may be substituted for the retainer ring shown in Figs. 1 to 7 inclusive.

Fig. 17 is a sectional view taken on the line 17—17 of Fig. 16.

Fig. 18 is a developed view of still another type of retainer ring which may be substituted for the retainer ring shown in Figs. 1 to 7 inclusive.

Fig. 19 is a sectional view taken on the line 19—19 of Fig. 18.

Referring now to the drawings wherein like numerals refer to like and corresponding parts throughout the several views, the illustrative embodiment of the invention disclosed in Figs. 1 to 7 inclusive comprises, in general, a coupling member 20 composed of a male externally threaded end 21, a central hexagonal wrench grip 22, and an internally threaded or otherwise deformed cup portion 23 opposite the said externally threaded end 21. The said coupling member 20 has a fluid pass aperture 24 axially therethrough which is preferably counterbored at 25 to accommodate a tubular fluid pass stem 26 over which the reinforced flexible hose 27 is telescoped during assembly. Obviously, an internally threaded female end may be substituted for the externally threaded male end 21 of the coupling member 20 where a female coupling is desired or required.

The reinforced flexible hose 27 generally composed of an inner rubber, neoprene or like tube 28 covered with a woven, meshed or spiral reinforcement 29 which in turn is sheathed with rubber, neoprene or the like 30 is preferably turned down or otherwise reduced to a smaller diameter at its end which is to be engaged by the cup portion 23 of the coupling member 20 until only a thin continuous sheath 300 of rubber, neoprene or the like remains over the reinforcement 29. A retainer ring 31 having a plurality of apertures 32 therethrough is telescoped over the reduced end of the said reinforced flexible hose 27 and the said flexible hose 27 and retainer ring 31 are telescoped into the cupped end 23 of the coupling member 20 and over the tubular fluid pass stem 26 therein, see Fig. 2. The said retainer ring 31 is preferably radiused, beveled or otherwise smoothed on the inside thereof around the said apertures 32 as indicated by the numeral 33 in Figs. 1, 2 and 7 to prevent the said retainer ring 31 from cutting into the protective layer 300 of rubber, neoprene or the like and to prevent the said retainer ring 31 from cutting into the reinforcement 29 of the flexible hose 27 during repeated flexing with respect to the coupling member 20 when the protective layer 300 is not present over the said reinforcement 29. It is preferable that the said thin continuous protective layer 300 of rubber, neoprene or the like be provided over the reinforcement 29 inasmuch as a cushioning of the grip between the retainer ring 31 will then be present whereby to prevent any undue wearing of the reinforcement 29 of the reinforced flexible hose 27 when flexed repeatedly with respect to the coupling member 20.

After assembly of the reduced end of the flexible hose 27 and the retainer ring 31 into the cup portion 23 of the coupling member 20 as shown in Fig. 2, the said cup portion 23 of the coupling member 20 is crimped, swedged or otherwise pressed as indicated in Fig. 3 whereby to compress the said retainer ring 31 into intimate engagement with the flexible hose 27 and to grip the said flexible hose 27 between the said retainer ring 31 and the tubular fluid pass stem 26. The crimping, swedging or otherwise pressing the said cup portion 23 of the coupling member 20 deforms the internal threads 230 of the said cup portion 23 except at the apertures 32 in the retainer ring 31 whereby to provide anchorage of the said retainer ring 31 within the crimped cup portion 23 of the coupling member 20 as indicated in Fig. 4. To admit of the retainer ring 31 being easily and readily deformed within the cup member 23, the said retainer ring is not completely closed as indicated in Fig. 5, the space 34 being sufficient to permit the ring to conform readily to the curvature of the inside of the cup portion 23 of the coupling member 20 when the flexible hose 27 is gripped or anchored therein by swedging, crimping or pressing as indicated in Fig. 3.

The deformation of the cup portion 23 of the coupling member 20 to the shape indicated in Figs. 3 and 4 not only causes the said cup portion 23 of the coupling member 20 to grip the retainer ring 31 and causes the retainer ring to grip the reinforced flexible hose 27, but, the reinforcement 29 and continues protective layer 300 of rubber, neoprene or the like thereover are deformed into the apertures 32 in the retainer ring 31 substantially as indicated in Fig. 4 whereby to provide a positive anchorage for the reinforced flexible hose 27 in the said cupped end of the coupling member 20. With such a connection between the reinforced flexible hose 27 and the coupling member 20, the said flexible hose will withstand repeated flexings with respect to the coupling member 20 while under both pressure and tension without weakening the reinforcement 29 or the anchorage of the said reinforced flexible hose 27 to the coupling member 20.

Obviously, other types of retainer rings than the retainer ring 31 disclosed in Figs. 5 to 7 inclusive may be employed in the instant invention with like and similar results.

Figs. 8 and 9 disclose in developed and sectional views respectively a retainer ring 35 which, when formed to the proper diameter, may be substituted for the retainer ring 31 in the construction shown in Figs. 1 to 4 inclusive. The retainer ring 35 is provided with shield shaped apertures 36 and preferably has its inside face around the said apertures 26 radiused, beveled or otherwise smoothed as indicated by the numeral 37. The said retainer ring 35 may be castellated by providing axially disposed slots 38 between the rows of shield shaped apertures 36 to permit it to conform readily to the curvature of the inside of the cup portion 23 of the coupling member 20 when the flexible hose 27 is gripped and anchored in the cup portion 23 of the coupling member 20 by swedging, crimping or pressing as indicated in Figs. 3 and 4.

Figs. 10 and 11 disclose in developed and sectional views respectively a retainer ring 39 which also may be substituted for the retainer ring 31 in the construction shown in Figs. 1 to 4 inclusive.

The retainer ring 39 is formed with a plurality of circumferentially disposed axially spaced crimps forming external and internal axially spaced ribs 40 and 41 respectively. The said retainer ring 39 likewise may be castellated for the same reason that the retainer ring 35 is castellated by providing a plurality of spaced axially disposed slots 42 substantially as indicated in Fig. 10.

Figs. 12 and 13 disclose in developed and sectional views respectively a retainer ring 43 which likewise may be substituted for the retainer ring 31 in the construction shown in Figs. 1 to 4 inclusive. The said retainer ring 43 is formed with knurled inner and outer surfaces and is preferably castellated by providing it with a plurality of spaced axially disposed slots 44 as indicated in Fig. 13. Apertures 45 are provided between each of the axially disposed slots 44 to admit of the reinforcement 29 of the flexible hose 27 to bulge therethrough as it does through the apertures 32 of the retainer ring 31 as best shown in Fig. 4. It is preferable that the knurling employed be sufficient for anti-friction but not so sharp as to cut the reinforcement of the flexible hose 27 if the thin continuous sheath 300 of rubber, neoprene or the like is not left over the reinforcement 29 of the flexible hose 27. The inside face of the retainer ring 43 around the apertures 45 therethrough is preferably radiused, beveled or otherwise smoothed.

Figs. 14 and 16 disclose in developed and sectional views respectively a still further alternate type retainer ring 46 which has a plurality of staggered circumferentially spaced apertures 47 therethrough axially opposite which are axially disposed slots 48 which are employed to castellate the said retainer ring 46. The inside face of the retainer ring 46 around the apertures 47 therethrough is preferably radiused, beveled or otherwise smoothed as indicated by the numeral 49.

Figs. 16 and 17 also disclose in developed and sectional views respectively a retainer ring 50 which also may be substituted for the retainer ring 31 in the construction shown in Figs. 1 to 4 inclusive. The said retainer ring 50 has a plurality of axially disposed rows of circumferentially elongated apertures 51 therein between which are positioned axially disposed slots 52 which are employed to castellate the said retainer ring 50. The inside face of the retainer ring 50 around the elongated apertures 51 thereof is preferably radiused, beveled or otherwise smoothed as indicated by the numeral 53.

The retainer ring 54 disclosed in developed and sectional views 18 and 19 respectively is of the same general arrangement and detail of the retainer ring 50 except it has more rows of shorter elongated apertures 55 with axially disposed slots 56 therebetween. The inside face of the said retainer ring 54 is likewise preferably smoothed around the elongated apertures 55 thereof by radiusing, beveling or the like as indicated by the numeral 57.

The retainer rings 39, 43, 46, 50 and 54 are only a few of many types of apertured and/or deformed and/or castellated retainer rings that may be substituted for the retainer ring 31 disclosed in Figs. 5 to 7 inclusive and employed in the illustrative embodiment of the invention disclosed in Figs. 1 to 4 inclusive.

It has been shown in the drawings that retainer rings 39, 43, 46, 50 and 54 are castellated at both ends, however, if desired, the said retainer rings need not be castellated at either end or they need not be castellated at all if the said retainer rings are formed to be slightly opened prior to assembly and before crimping, swedging or otherwise forming the cupped end 23 of the coupling member 20 into its permanent engaged relationship over the reinforced flexible hose 27 as shown in Fig. 4.

Although but one embodiment of the invention has been disclosed and described in detail together with a number of suggested forms of retainer rings, it is obvious that many changes may be made in the size, shape, arrangement and detail of the various elements of the invention without departing from the spirit thereof as defined by the appended claim, the specific disclosures herein and in the drawings being intended to be illustrative and not limiting.

We claim:

In a reinforced flexible hose having an outer layer of rubber, neoprene or the like over the reinforcement thereof and having the said outer layer cut-away near the end of the said hose leaving a thin protective layer over said reinforcement and a coupling member including an internally deformed cupped portion and a fluid pass stem disposed axially therein and substantially coextensive of said deformed cupped portion, means for securing said coupling member to said hose comprising an apertured retainer ring positioned over said cut-away end of said reinforced flexible hose, the said cut-away end of said hose and said retainer ring being telescoped within the said cupped portion of said coupling member and over said fluid pass stem thereof, and the said cupped portion of said coupling member being compressed sufficiently with respect to said retainer ring and fluid pass stem whereby to grip said retainer ring and force said reinforcement and protective layer thereover in anchored relationship with respect to the said retainer ring within the apertures thereof.

NORMAN M. COUTY.
WILLIAM F. CORLEY.